(12) United States Patent
Jeon et al.

(10) Patent No.: US 11,749,140 B2
(45) Date of Patent: Sep. 5, 2023

(54) DISPLAY APPARATUS

(71) Applicant: LG Display Co., Ltd., Seoul (KR)

(72) Inventors: Yongjoon Jeon, Paju-si (KR); Seokhyo Cho, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 25 days.

(21) Appl. No.: 17/391,791

(22) Filed: Aug. 2, 2021

(65) Prior Publication Data

US 2022/0044600 A1 Feb. 10, 2022

(30) Foreign Application Priority Data

Aug. 7, 2020 (KR) ........................ 10-2020-0099475

(51) Int. Cl.
*G09F 9/37* (2006.01)
*G06F 1/18* (2006.01)
*G09G 3/20* (2006.01)

(52) U.S. Cl.
CPC ................. *G09F 9/37* (2013.01); *G06F 1/181* (2013.01); *G09G 3/20* (2013.01); *G09G 2330/02* (2013.01); *G09G 2354/00* (2013.01)

(58) Field of Classification Search
CPC .. G09F 9/37; G06F 1/181; G09G 3/20; G09G 2330/02; G09G 2354/00
See application file for complete search history.

(56) References Cited

U.S. PATENT DOCUMENTS

| | | | |
|---|---|---|---|
| 10,743,428 B2 | 8/2020 | Cho | |
| 10,878,728 B2 | 12/2020 | Yoon | |
| 2004/0239753 A1 | 12/2004 | Proctor et al. | |
| 2011/0084893 A1* | 4/2011 | Lee | G06F 3/016 345/6 |
| 2014/0210803 A1* | 7/2014 | Oh | G06F 1/1677 345/207 |
| 2019/0346954 A1* | 11/2019 | Jung | H04M 1/0268 |
| 2020/0051370 A1* | 2/2020 | Solaja | G06F 3/147 |
| 2020/0051517 A1* | 2/2020 | Kim | G09G 3/3685 |
| 2020/0212326 A1 | 7/2020 | Eom | |

FOREIGN PATENT DOCUMENTS

| | | |
|---|---|---|
| JP | 2004-384295 A | 12/2004 |
| JP | 2013-7790 A | 1/2013 |
| KR | 10-0564401 B1 | 3/2006 |
| KR | 10-0800074 B1 | 2/2008 |
| KR | 10-2017-0134844 A | 12/2017 |
| KR | 10-1975188 B1 | 5/2019 |
| KR | 10-2019-0092980 A | 8/2019 |
| KR | 10-2011885 B1 | 8/2019 |
| KR | 10-2020-0007366 A | 1/2020 |
| KR | 10-2020-0080020 A | 7/2020 |
| KR | 10-2020-0084980 A | 7/2020 |

* cited by examiner

*Primary Examiner* — Sejoon Ahn

(74) *Attorney, Agent, or Firm* — Birch, Stewart, Kolasch & Birch, LLP

(57) ABSTRACT

A display apparatus include a display module, a cover plate, and a lifting module. The display module includes a display panel that displays an image in a display area. The display area includes an Always On Display (AOD) area. The cover plate covers a portion of the display module. The lifting module moves vertically the cover plate. At least the AOD area of the display area is not covered with the cover plate and is exposed to an outside. AOD data is displayed in the AOD area. Thus, an AOD function can be implemented.

20 Claims, 13 Drawing Sheets

DISPLAY APPARATUS

CROSS-REFERENCE TO RELATED APPLICATION

This application claims the benefit priority under 35 U.S.C. § 119(a) to Korean Patent Application No. 10-2020-0099475 filed on Aug. 7, 2020, in the Korean Intellectual Property Office, the entire contents of which are expressly incorporated herein by reference for all purposes into the present application.

BACKGROUND

Field

The present disclosure relates to a display apparatus including a display module and a cover plate covering at least a portion of the display module.

Description of Related Art

As an information society develops, the number of functions needed for a display apparatus that displays an image is increasing.

An example of a function needed for the display apparatus can be a function of providing various screen ratios such that a viewer can view an image conveniently.

Another example of a function needed for the display apparatus can be a function of displaying data that can be identified by a user at any time.

In addition, a display apparatus disposed indoors such as televisions and monitors needs to have a design that can minimize deterioration of aesthetics of an indoor interior.

SUMMARY OF THE INVENTION

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

A purpose of the present disclosure is to provide a display apparatus that can minimize deterioration of aesthetics of an indoor interior.

A purpose of the present disclosure is to provide a display apparatus having an Always On Display (AOD) function.

A purpose of the present disclosure is to provide a display apparatus that can implement image display at various screen ratios.

Purposes in accordance with the present disclosure are not limited to the above-mentioned purpose. Other purposes and advantages in accordance with the present disclosure as not mentioned above can be understood from following descriptions and more clearly understood from embodiments in accordance with the present disclosure. Further, it will be readily appreciated that the purposes and advantages in accordance with the present disclosure can be realized by features and combinations thereof as disclosed in the claims.

An example according to the present disclosure provides a display apparatus including a display module, a cover plate covering a portion of the display module, and a lifting module that lifts or lowers the cover plate. The display module includes a display panel that displays an image in a display area including an Always On Display (AOD) area.

In this connection, an outer appearance of the cover plate covering the portion of the display module can be easily selected from a variety of designs to be suitable for a user's taste or an indoor interior. Thus, the deterioration of the aesthetics of the indoor interior due to the display apparatus can be reduced.

The display module can operate in one of a plurality of view modes corresponding to different vertical levels of the cover plate. The plurality of view modes can include a first mode in which an image is displayed over the entire display area, a second mode in which the image is displayed in the AOD area of the display area that is not covered with the cover plate, and a third mode in which the image is displayed in a cinema area of the display area. The third mode corresponds to a screen ratio different from that corresponding to the first mode. In the second mode, the cover plate can ascend via the lifting module to cover the rest of the display area except for the AOD area.

AOD data can be displayed in the AOD area of the display area which is not covered with the cover plate. Thus, the display apparatus can have an AOD function.

Further, a vertical level of the cover plate can vary via the lifting module, such that a width of an area of the display area as not covered with the cover plate can easily vary. As a result, an area that is not used for image display according to a screen ratio different from that in the first mode is covered with the cover plate. Thus, various screen ratios can be implemented, and convenience and utility can be improved.

Effects and advantages in accordance with the present disclosure can be as follows but are not be limited thereto.

The display apparatus according to one implementation of the present disclosure includes the cover plate covering the portion of the display module. Since the vertical level of the cover plate can be freely selected from a variety of designs according to the user's convenience and the indoor interior, the deterioration of the aesthetics of the indoor interior due to the installation of the display apparatus can be reduced.

The display module includes the display panel that displays the image in the display area, and the display area includes the AOD area that is not covered with the cover plate. Accordingly, the AOD data can be displayed in the AOD area. Thus, the display apparatus can have the AOD function.

Since the cover plate is raised and lowered by the lifting module, a width of the portion of the display area as covered with the cover plate can vary. Accordingly, the various screen ratios can be implemented due to the portion of the display area that is not covered with the cover plate. Further, the area of the display area where the image is not displayed according to various screen ratios can be covered with the cover plate.

As a result, aesthetics, convenience, and utility of the display apparatus can be improved.

In addition to the effects and advantages as described above, specific or other effects and advantages in accordance with the present disclosure will be described together with the detailed description for carrying out the disclosure.

BRIEF DESCRIPTION OF DRAWINGS

The present invention will become more fully understood from the detailed description given hereinbelow and the accompanying drawings which are given by way of illustration only, and thus are not limitative of the present invention.

DETAILED DESCRIPTION OF THE EMBODIMENTS

Figure 1:
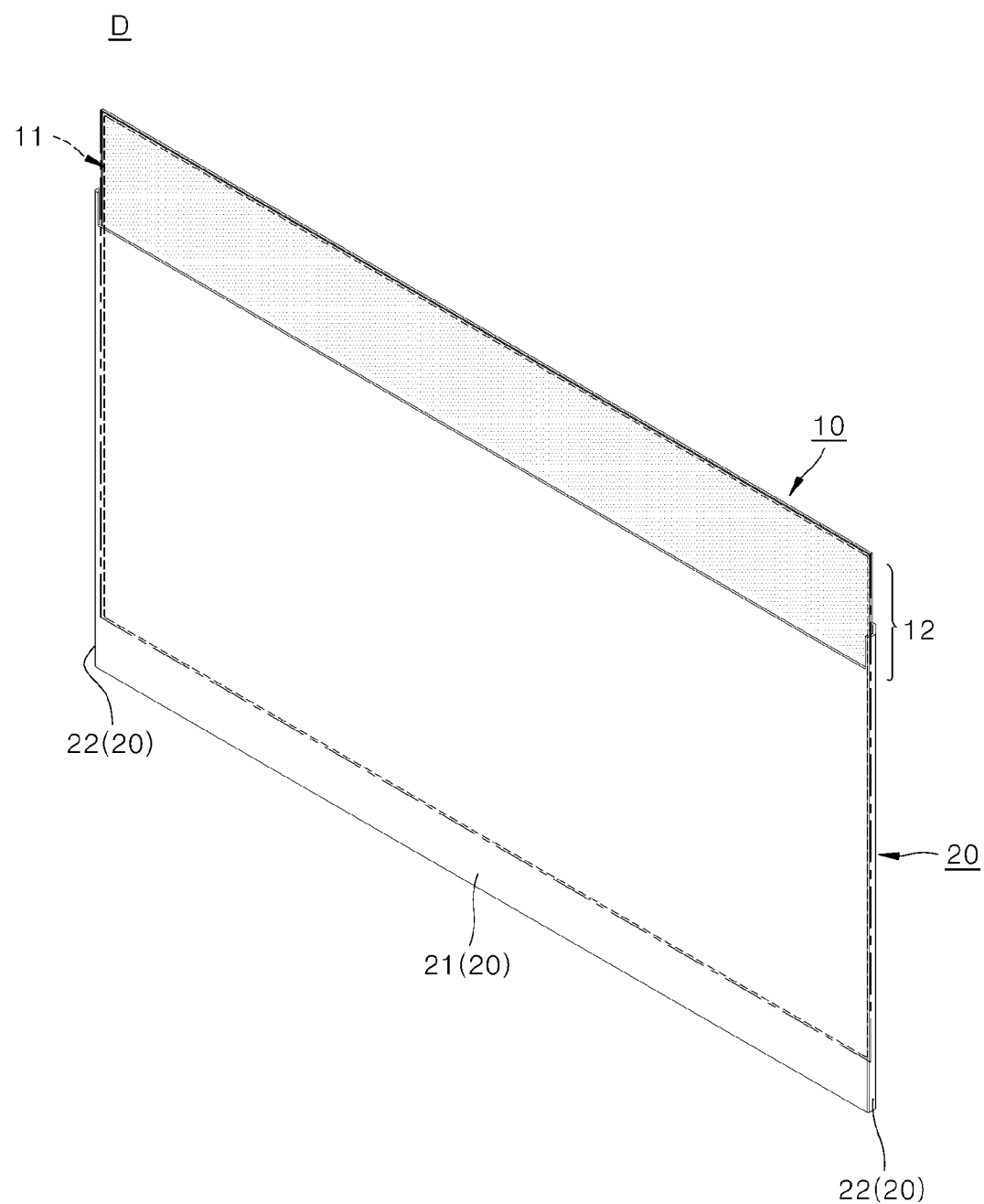
FIG. 1, FIG. 2, FIG. 3, and FIG. 4 are diagrams showing a display apparatus according to one implementation of the present disclosure.

Advantages and features of the present disclosure, and a method of achieving the Advantages and features will become apparent with reference to embodiments described later in detail together with the accompanying drawings. However, the present disclosure is not limited to the embodiments as disclosed below, but can be implemented in various different forms. Thus, these embodiments are set forth only to make the present disclosure complete, and to completely inform the scope of the disclosure to those of ordinary skill in the technical field to which the present disclosure belongs, and the present disclosure is only defined by the scope of the claims.

A shape, a size, a ratio, an angle, a number, etc. disclosed in the drawings for describing the embodiments of the present disclosure are exemplary, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure can be practiced without these specific details. In other instances, well-known methods, procedures, components, and circuits have not been described in detail so as not to unnecessarily obscure aspects of the present disclosure.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements can modify the entire list of elements and may not modify the individual elements of the list. In interpretation of numerical values, an error or tolerance therein can occur even when there is no explicit description thereof.

In addition, it will also be understood that when a first element or layer is referred to as being present "on" a second element or layer, the first element can be disposed directly on the second element or can be disposed indirectly on the second element with a third element or layer being disposed between the first and second elements or layers. It will be understood that when an element or layer is referred to as being "connected to", or "coupled to" another element or layer, it can be directly on, connected to, or coupled to the other element or layer, or one or more intervening elements or layers can be present. In addition, it will also be understood that when an element or layer is referred to as being "between" two elements or layers, it can be the only element or layer between the two elements or layers, or one or more intervening elements or layers can also be present.

In descriptions of temporal relationships, for example, temporal precedent relationships between two events such as "after", "subsequent to", "before", etc., another event can occur therebetween unless "directly after", "directly subsequent" or "directly before" is indicated.

It will be understood that, although the terms "first", "second", "third", and so on can be used herein to describe various elements, components, regions, layers and/or sections, these elements, components, regions, layers and/or sections should not be limited by these terms. These terms are used to distinguish one element, component, region, layer or section from another element, component, region, layer or section and may not necessarily define order. Thus, a first element, component, region, layer or section described below could be termed a second element, component, region, layer or section, without departing from the spirit and scope of the present disclosure.

The features of the various embodiments of the present disclosure can be partially or entirely combined with each other, and can be technically associated with each other or operate with each other. The embodiments can be implemented independently of each other and can be implemented together in an association relationship.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a display apparatus according to various implementations of the present disclosure and an operating method thereof will be described with reference to the attached drawings. All the components of each display apparatus according to the various implementations of the present disclosure are operatively coupled and configured.

First, with reference to FIG. 1, FIG. 2, FIG. 3, and FIG. 4, a display apparatus according to one implementation of the present disclosure will be described.

Figure 2:
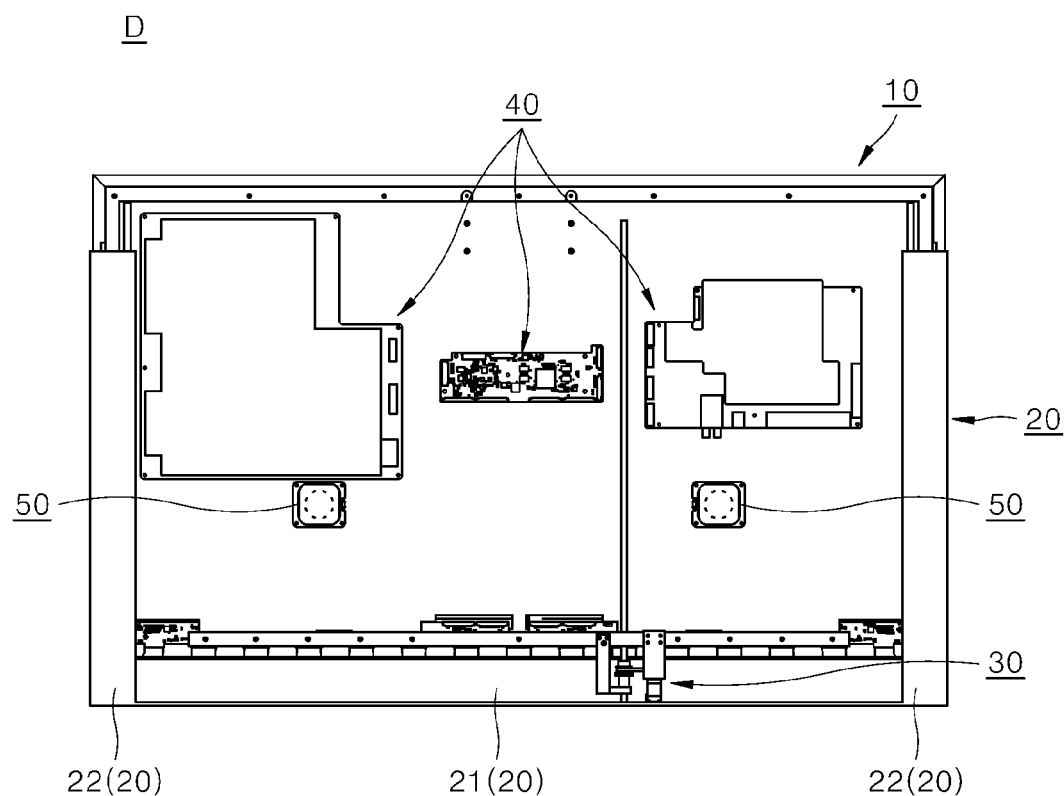
Figure 3:
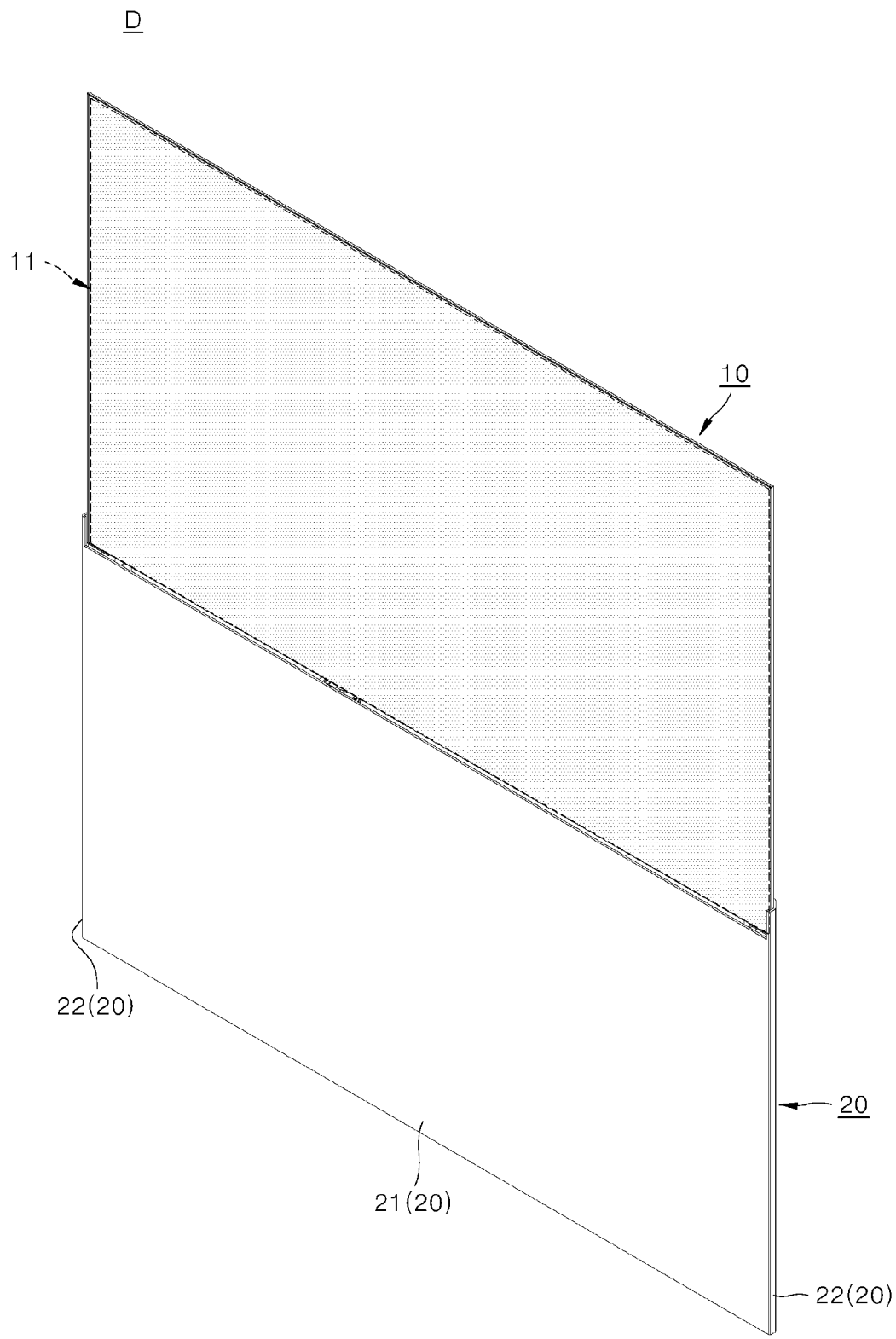
Figure 4:
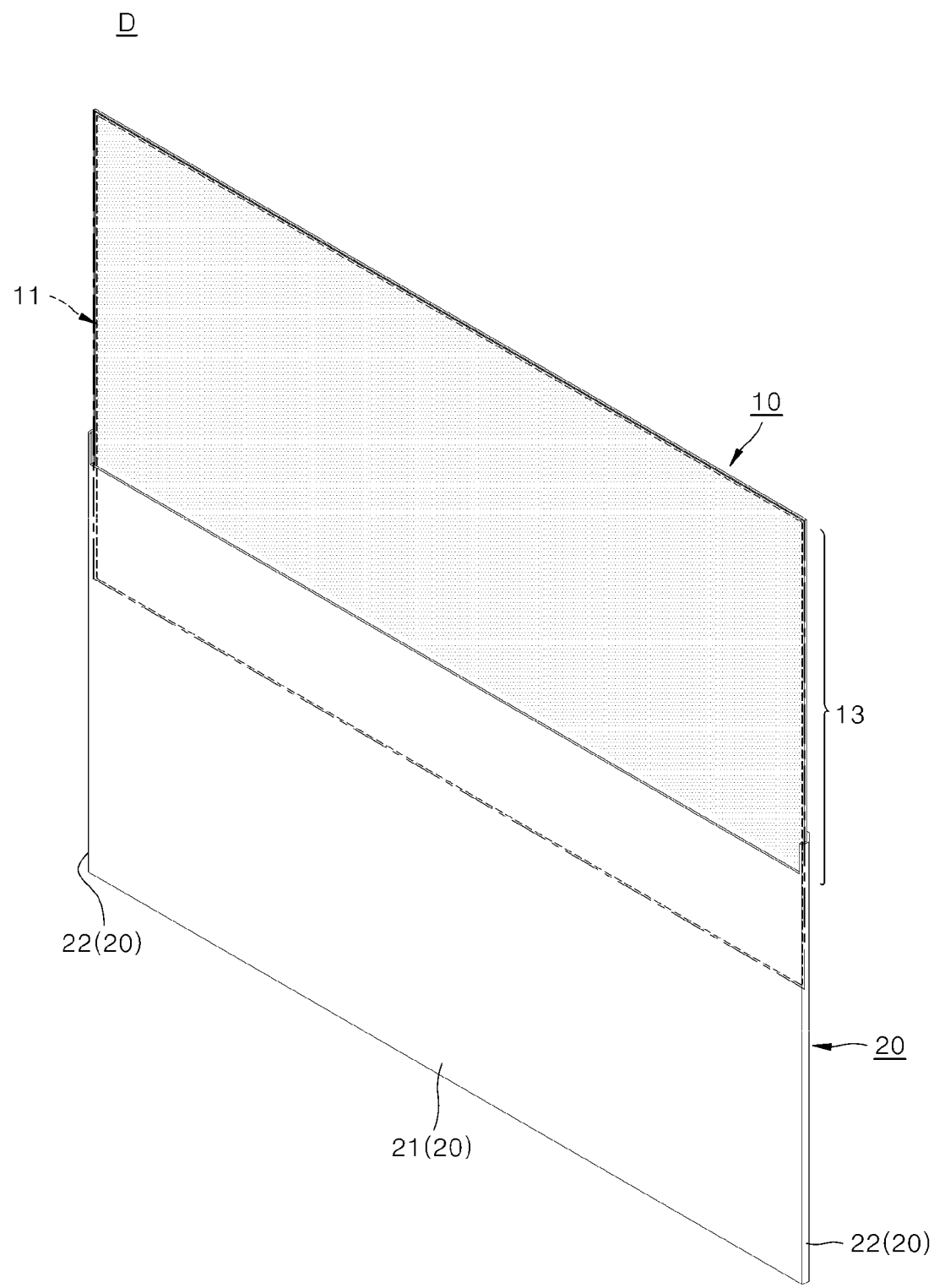

FIG. 1, FIG. 2, FIG. 3, and FIG. 4 are diagrams showing a display apparatus according to one implementation of the present disclosure. FIG. 1 is a diagram showing a front face of the display apparatus corresponding to a cover mode (second mode). FIG. 2 is a diagram showing a rear face of the display apparatus corresponding to the cover mode. FIG. 3 is a diagram showing a front face of the display apparatus corresponding to a general display mode (first mode). FIG. 4 is a diagram showing a front face of the display apparatus corresponding to a cinema display mode (third mode).

As shown in FIG. 1, a display apparatus D according to one implementation of the present disclosure includes a display module 10 and a cover plate 20 for covering a portion of the display module 10. The display module 10 has a flat plate shape and includes a display panel (110 in FIG. 6) that displays an image in a display area 11 including an Always On Display (AOD) area 12.

Further, as shown in FIG. 2, the display apparatus D according to one implementation of the present disclosure can further include a lifting module 30 disposed on a rear face of the display module 10 to raise or lower the cover plate 20.

As shown in FIG. 1, the display module 10 includes the display panel 110 that displays an images on the display area 11. Hereinafter, it is assumed that the display area 11 is disposed on a front face of the display panel (110 in FIG. 9) that emits light for image display in the display module 10.

The display area 11 includes an AOD area 12 for displaying AOD data regardless of a vertical level of the cover plate. In this connection, the AOD area 12 can be selected as a partial area which is a top area of the display area 11.

The cover plate 20 refers to a cover member that covers the portion of the display module 10. Regardless of the vertical level of the cover plate, the cover plate 20 covers at least a portion of a side of the display module 10 and does not cover the AOD area 12.

The cover plate 20 includes a front portion 21 corresponding to a portion of the display area 11 and a side portion 22 disposed on each of both sides of the front portion 21. The side portion 22 is bent to wrap around a partial area of each side of the display module 10 and extends toward the rear face of the display module 10.

The front portion 21 corresponds to a remaining area of the display area 11 except for the AOD area 12 where AOD (Always On Display) data is displayed.

For example, the front portion 21 of the cover plate 20 corresponds to a remaining partial area as an lower portion of the display area 11 except for the AOD area 12 as an upper portion thereof. Accordingly, in any case, the AOD area 12 of the display area 11 that displays the AOD data is not covered with the cover plate 20 and is exposed to the outside. Thus, the AOD function can be realized.

As shown in FIG. 2, the lifting module 30 is disposed on a rear face of the display panel 110 opposite to a front face including the display area 11 of the display module 10 and is fixed to the cover plate 20. The lifting module 30 can use power of a motor assembly to raise and lower the cover plate 20.

One portion of the lifting module 30 can be disposed on the rear face of the display module 10, and the other portion thereof can be disposed under the display module 10. The front portion 21 of the cover plate 20 can disallow the other portion of the lifting module 30 disposed under the display module 10 to be visible to the user in front of the display apparatus D.

In addition, the display module 10 can further include at least one printed circuit board 40 disposed on the rear face thereof.

Further, the display apparatus D can further include a sound module 50 disposed on the rear face of the display module 10. The sound module 50 can be embodied as a CSO (Cinematic Sound OLED or Crystal Sound OLED) that transmits sound using the display panel of the display module 10 as a diaphragm.

The lifting module 30 can fix the cover plate 20 to the display module 10 and change a vertical level of the cover plate 20.

Accordingly, the display module 10 according to one implementation of the present disclosure can operate in a plurality of view modes corresponding to different vertical levels of the cover plate 20.

The plurality of view modes can include a general display mode (first mode) in which an image is displayed over an entirety of the display area 11, a cover mode (second mode) in which an image is displayed in the AOD area 12 of the display area 11, and a cinema display mode (third mode) in which an image is displayed in a cinema area of the display area 11 corresponding to a screen ratio different from a screen ratio corresponding to the first mode.

As shown in FIG. 1, when the display apparatus D operates in the cover mode, the cover plate 20 is disposed at the highest level corresponding to the cover mode under activation of the lifting module 30. The cover plate 20 at the highest level covers the rest of the display area 11 except for the AOD area 12 that displays the AOD data.

In this connection, the AOD area 12 of the display module 10 is continuously exposed to the outside while not being covered with the cover plate 20. Further, the portion of the lifting module 30 disposed under display module 10 is covered with the cover plate 20.

In this cover mode, the display module 10 can display the AOD data in the AOD area 12.

Specifically, the cover mode can include an AOD (Always On Display) mode in which the AOD data is displayed. The AOD data can refer to data that the user can identify at any time even when the display apparatus D does not display an image in the display area.

In one example, the AOD data can include information on date, time, and weather. However, this is only an example. The AOD data can vary according to the user's settings.

In addition, the display of the AOD data can be activated according to the user's settings.

In one example, when the display apparatus D in the cover mode receives an AOD request signal from the user, the display module 10 can change to a state in which the AOD data is displayed in the AOD area 12 in a turn-off state of the display module.

Alternatively, the display apparatus D in the cover mode can display the AOD data in the AOD area 12 of the display module 10 according to a condition set by the user. In this connection, the display condition of the AOD data can include at least one of a time duration for which the AOD data is displayed in the cover mode or whether the user is detected.

As shown in FIG. 3, when the display apparatus D operates in the general display mode, the cover plate 20 is disposed at the lowest level corresponding to the general display mode under activation of the lifting module 30. The cover plate 20 at the lowest level does not cover any area of the display area 11, so that the entire display area 11 is exposed to the outside.

As a result, the display module 10 displays an image over the entire display area 11. In other words, the display apparatus D in the general display mode provides an image display function at a screen ratio corresponding to the entire display area 11.

Alternatively, the display apparatus D can freely change the vertical level of the cover plate 20 using the lifting module 30, and thus can change a width of a portion of the display area 11 of the display module 10 covered with the cover plate 20. In this connection, the display module 10 can display an image in the cinema area of the display area 11 disposed above an area thereof covered with the cover plate 20, and not covered with the cover plate 20.

The cinema area can correspond to the vertical level of the cover plate 20 and can correspond to a screen ratio different from that in the general display mode. Accordingly, the display apparatus D can easily provide an image at various screen ratios.

As shown in FIG. 4, when the display apparatus D operates in the cinema display mode, the cover plate 20 is disposed at a predefined level corresponding to the screen ratio of the cinema display mode under activation of the lifting module 30. The cover plate 20 at this predefined level covers the rest of the display area 11 except for the cinema area 13.

In one example, the screen ratio can be defined as a ratio between a horizontal dimension and a vertical dimension of an area in which an image is displayed. When the horizontal dimension is constant, the vertical dimension corresponding to the screen ratio of the cinema display mode is smaller than the vertical dimension corresponding to the screen ratio of the general display mode.

Accordingly, in the cinema display mode, a lower portion of the display area 11 can be covered with the cover plate 20 by the vertical dimension corresponding to a difference between the screen ratio of the general display mode and the screen ratio of the cinema display mode.

Thus, in the cinema display mode corresponding to the screen ratio higher than that in the general display mode, the lower area of the display area 11 where an image is not displayed is covered with the cover plate 20, such that the area in which the image is not displayed in the display area 11 may not be visible to the user. Therefore, image visibility and convenience can be improved.

Figure 5:
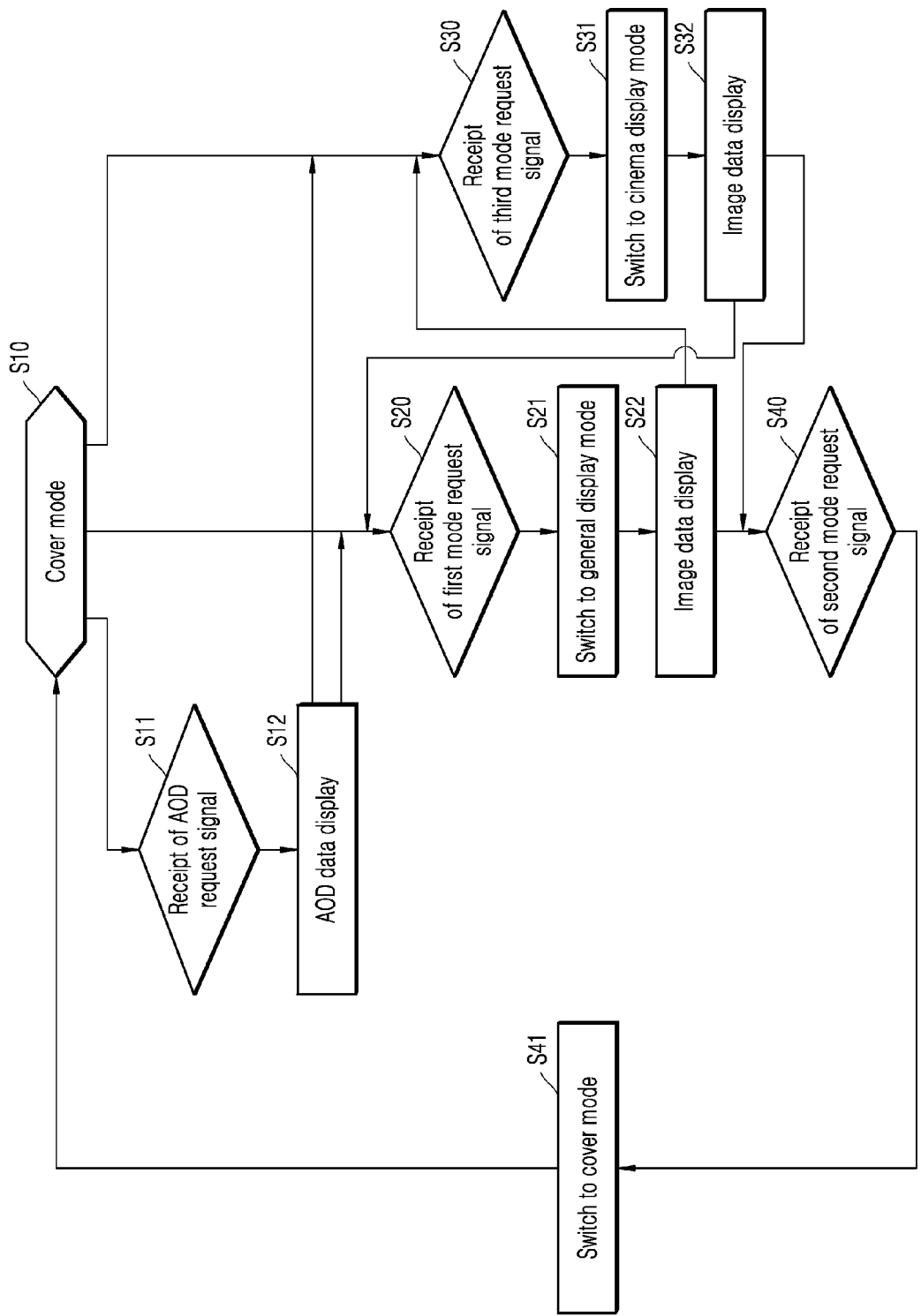
FIG. 5 is a diagram showing a method for operating a display apparatus according to one implementation of the present disclosure.

FIG. 5 is a diagram showing an operating method of a display apparatus according to one implementation of the present disclosure.

As shown in FIG. 5, a method of operating a display apparatus according to an embodiment of the present disclosure can include: displaying (S12) the AOD (Always On Display) data in the AOD area 12 of the display area 11 of the display module 10 as not covered with the cover plate 20, upon receiving (S11) an AOD request signal from an user interface in the cover mode (S10); upon receiving (S20) a first mode request signal from the user interface, changing (S21) the vertical level of the cover plate 20 to the lowest level corresponding to the general display mode under activation of the lifting module 30; displaying (S22) image data in an entirety of the display area 11; upon receiving (S30) a third mode request signal from the user interface, changing (S31) the vertical level of the cover plate 20 to a predefined level corresponding to the cinema display mode under activation of the lifting module 30; displaying (S32) displaying image data in the cinema area 13 of the display area 11; upon receiving (S40) a second mode request signal from the user interface, changing (S41) the vertical level of the cover plate 20 to the highest level corresponding to the cover mode under activation of the lifting module 30.

In this connection, the user interface can refer to an input device connected to the display apparatus D via wired or wireless communication. In one example, the user interface can be implemented as at least one of a keyboard, a mouse, a remote control, or a smart device.

The operating method of the display apparatus according to one implementation of the present disclosure can further include the step S11 of receiving the AOD request signal from the user interface in any operation mode.

In this case, the display apparatus D can change the vertical level of the cover plate 20 to the highest level corresponding to the cover mode based on the AOD request signal (S41).

The cover plate 20 at the highest level corresponding to the cover mode covers the rest of the display area 11 of the display module 10 except for the AOD area 12.

Further, the display apparatus D displays an AOD (Always On Display) data in the AOD area 12 of the display area 11 of the display module 10 (S12).

Alternatively, the display apparatus D displays the AOD data in the AOD area 12 of the display area 11 while maintaining the vertical level of the cover plate 20 at the same level as that when the AOD request signal is received, based on the AOD request signal.

The operating method of the display apparatus according to one implementation of the present disclosure further includes the step S21 of changing the vertical level of the cover plate 20 to the lowest level corresponding to the general display mode, upon receiving (S20) the first mode request signal from the user interface in any operation mode.

The cover plate 20 at the lowest level corresponding to the general display mode does not cover any portion of the display area 11 of the display module 10. Thus, the entire display area 11 of the display module 10 is exposed to the outside. Further, the display module 10 displays the image data over the entire display area 11 (S22).

The operating method of the display apparatus according to one implementation of the present disclosure further includes the step S31 of changing the vertical level of the cover plate 20 to a predefined level corresponding to the cinema display mode, upon receiving (S30) the third mode request signal from the user interface in any operation mode.

The cover plate 20 at the predefined level corresponding to the cinema display mode covers the remaining area of the display area 11 of the display module 10 except for the cinema area 13.

Further, the display apparatus D displays the image data in the cinema area 13 of the display area 11 of the display module 10 (S32).

In one example, the screen ratio corresponding to the general display mode can be set to 16:9, while the screen ratio corresponding to the cinema display mode can be set to 21:9. However, this is only an example. The screen ratio corresponding to the cinema display mode can vary according to the user's input under a condition that the screen ratio is higher than the screen ratio corresponding to the general display mode.

The operating method of the display apparatus according to one implementation of the present disclosure further includes the step S41 of changing the vertical level of the cover plate 20 to the highest level corresponding to the cover mode, upon receiving (S40) the second mode request signal from the user interface in any operation mode.

As described above, the display apparatus D according to one implementation of the present disclosure includes the cover plate 20 to cover the portion of the display module 10, and the lifting module 30 to lift or lower the cover plate 20.

Accordingly, in the cover mode (second mode), the remaining area of the display area 11 of the display module 10 except for the AOD area 12 can be covered with the cover plate 20. In this connection, easy design change of the cover plate 20 can allow the deterioration of the aesthetics of the indoor interior due to the display apparatus D to be reduced.

Further, according to one implementation of the present disclosure, regardless of the vertical level of the cover plate 20, the AOD area 12 of the display area 11 is always exposed to the outside. Accordingly, the display apparatus D displays the AOD data in the AOD area 12, such that the AOD function can be provided. In this connection, the display module 10 can display the AOD data in only the AOD area 12. Thus, power consumption of the display module 10 used when providing the AOD function can be minimized.

Further, according to one implementation of the present disclosure, the vertical level of the cover plate 20 can vary via activation of the lifting module 30. Thus, the vertical dimension of the portion of the display area 11 of the display module 10 covered with the cover plate 20 can be easily changed. Accordingly, the display apparatus D can provide a variety of screen ratios higher than the screen ratio of the general display mode as well as the screen ratio of the general display mode corresponding to the entire display area 11. In addition, when displaying an image at a screen ratio higher than the screen ratio of the general display mode, an area of the display area 11 in which black color rather than image data is displayed can be covered with the cover plate 20. Thus, the convenience of the display apparatus D and the utility thereof can be improved.

Next, with reference to FIG. 6, FIG. 7, FIG. 8, FIG. 9 and FIG. 10, the display module 10, the cover plate 20, and the lifting module 30 of the display apparatus D according to one implementation of the present disclosure will be described.

Figure 6:
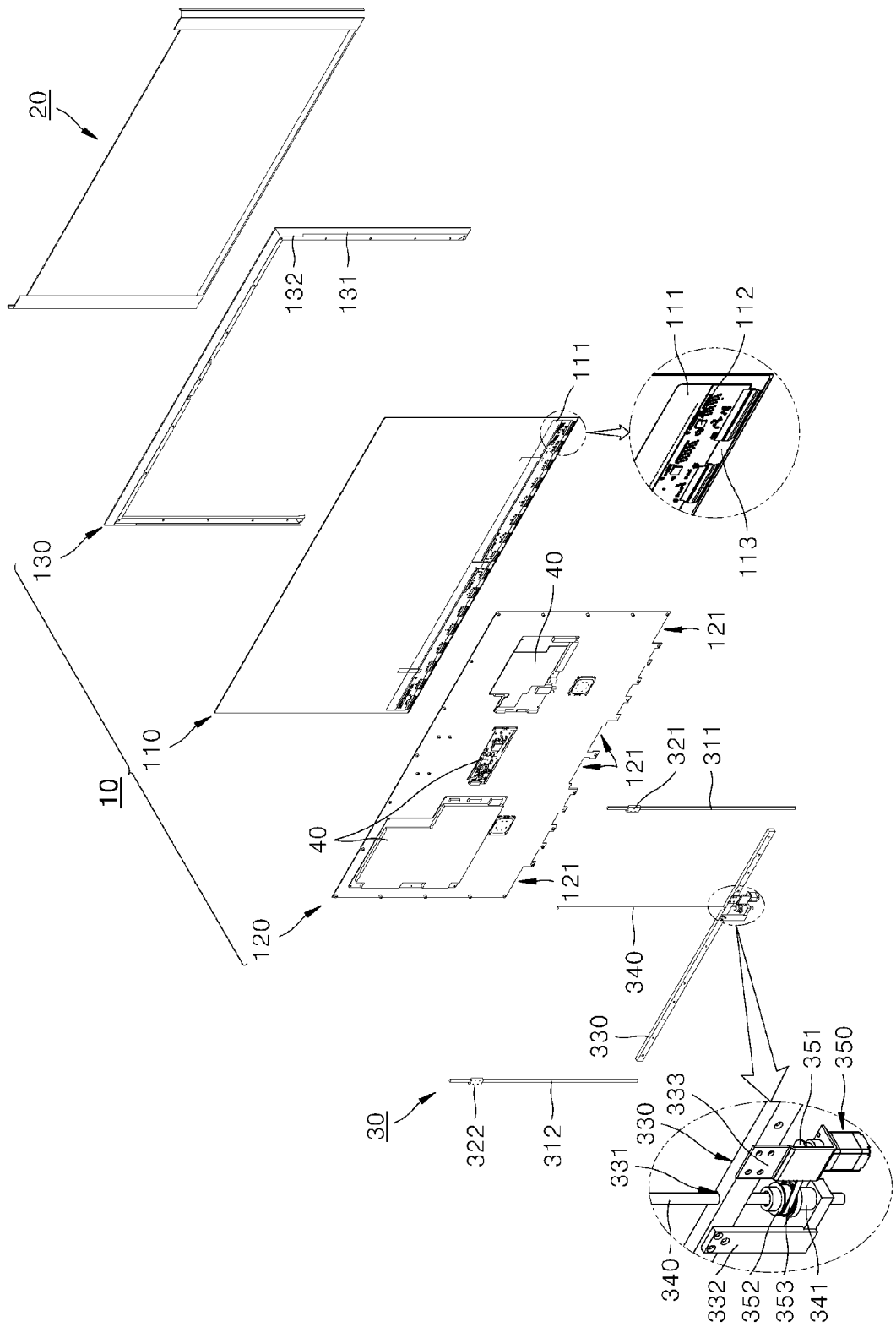
FIG. 6 is an exploded perspective view of a display apparatus according to one implementation of the present disclosure.
Figure 7:
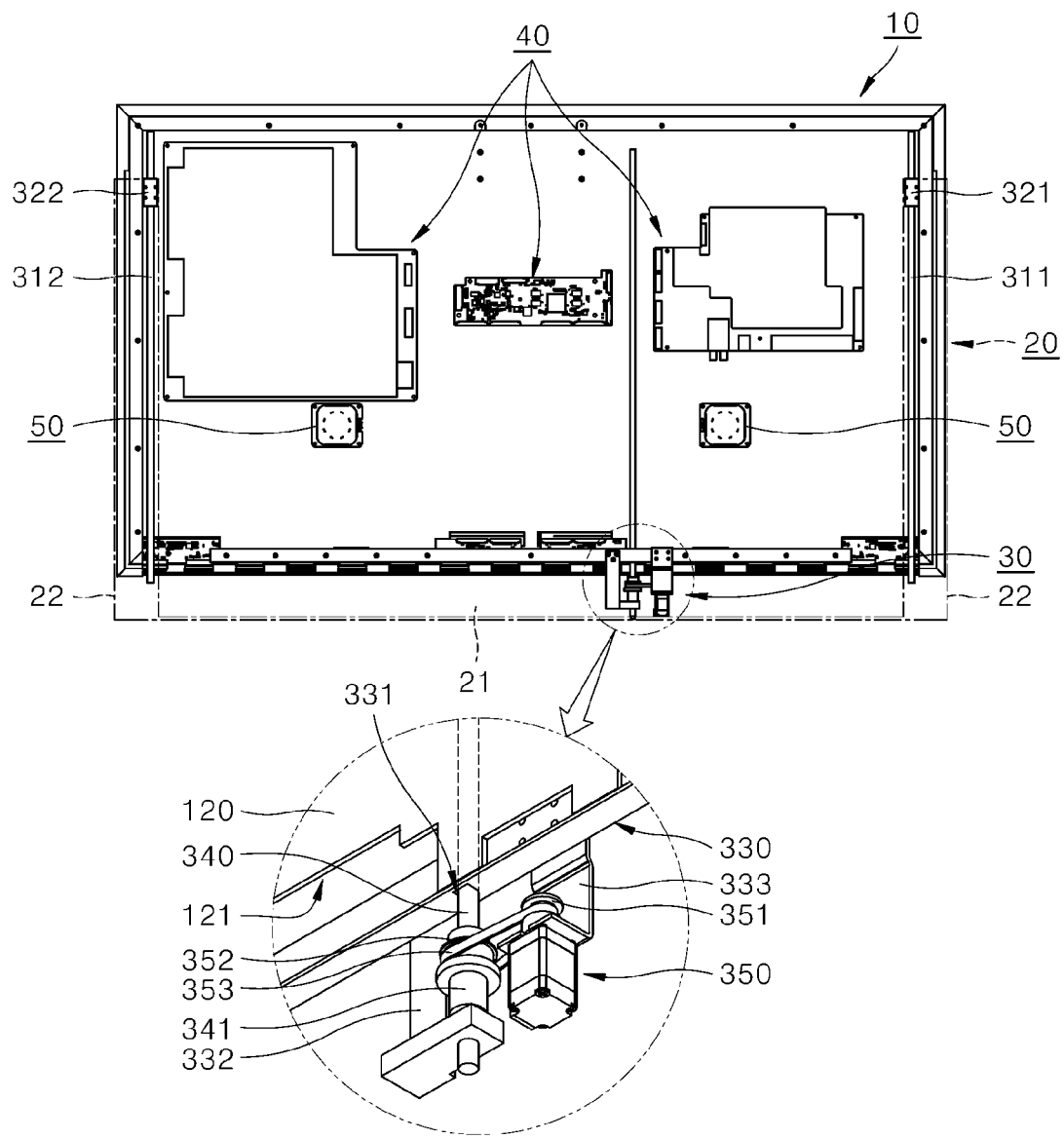
FIG. 7 is a view showing a cover plate and a lifting module corresponding to a cover mode in the display apparatus shown in FIG. 6.
Figure 8:
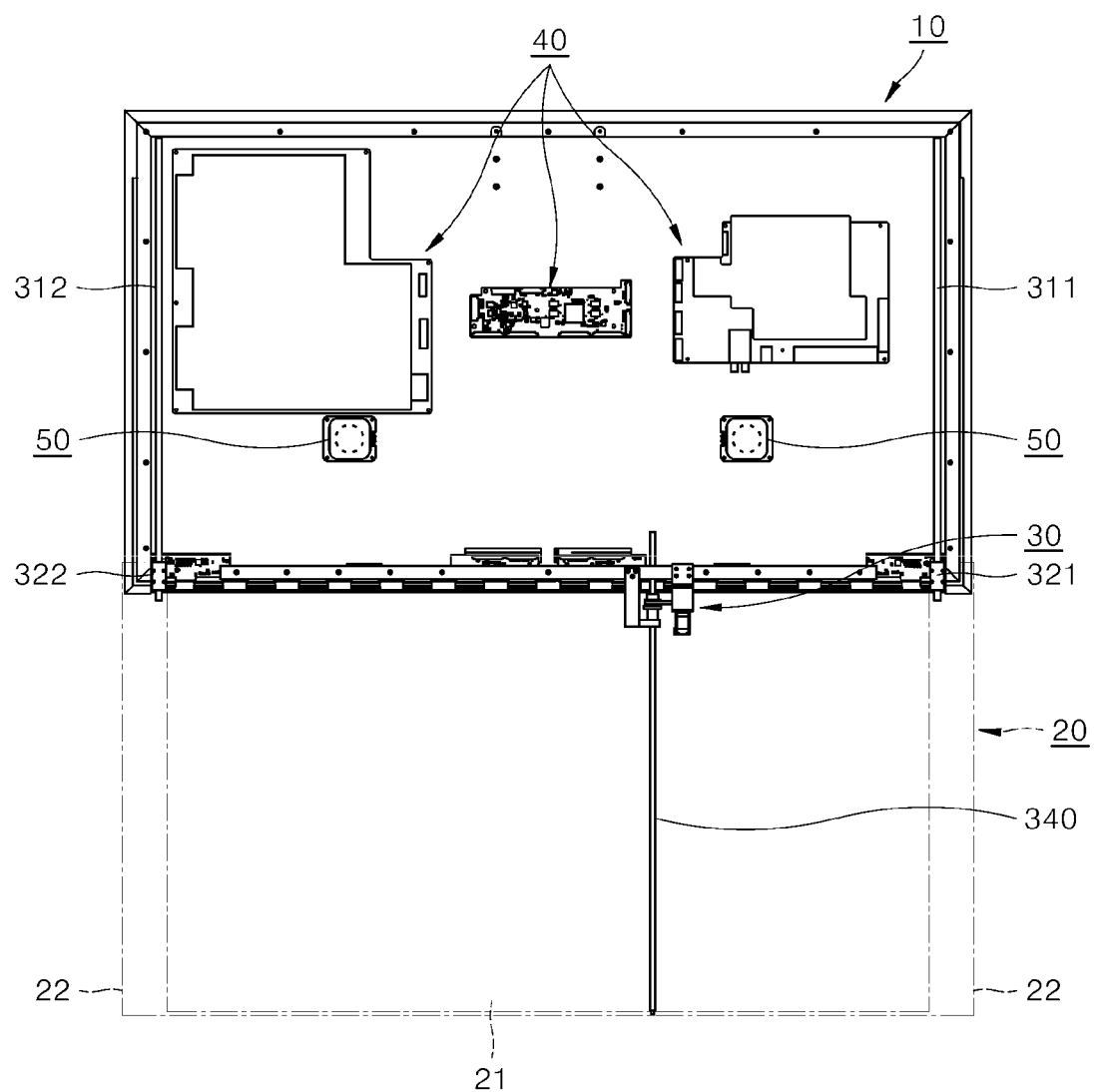
FIG. 8 is a view showing a cover plate and a lifting module corresponding to a general display mode in the display apparatus shown in FIG. 6.
Figure 9:
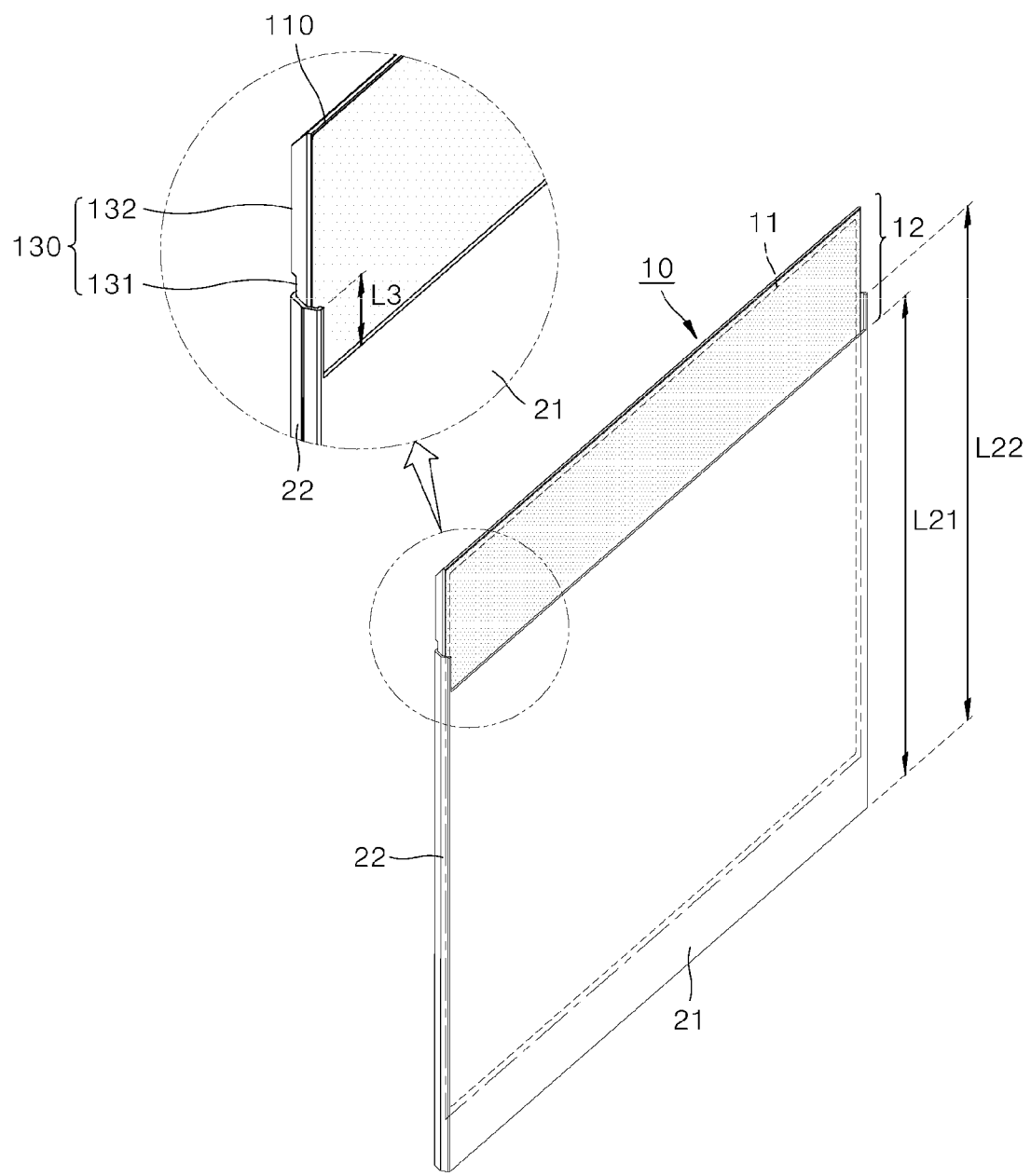
FIG. 9 is a diagram showing an arrangement of a display panel, a side cover, and a cover plate corresponding to a cover mode in the display apparatus shown in FIG. 6.
Figure 10:
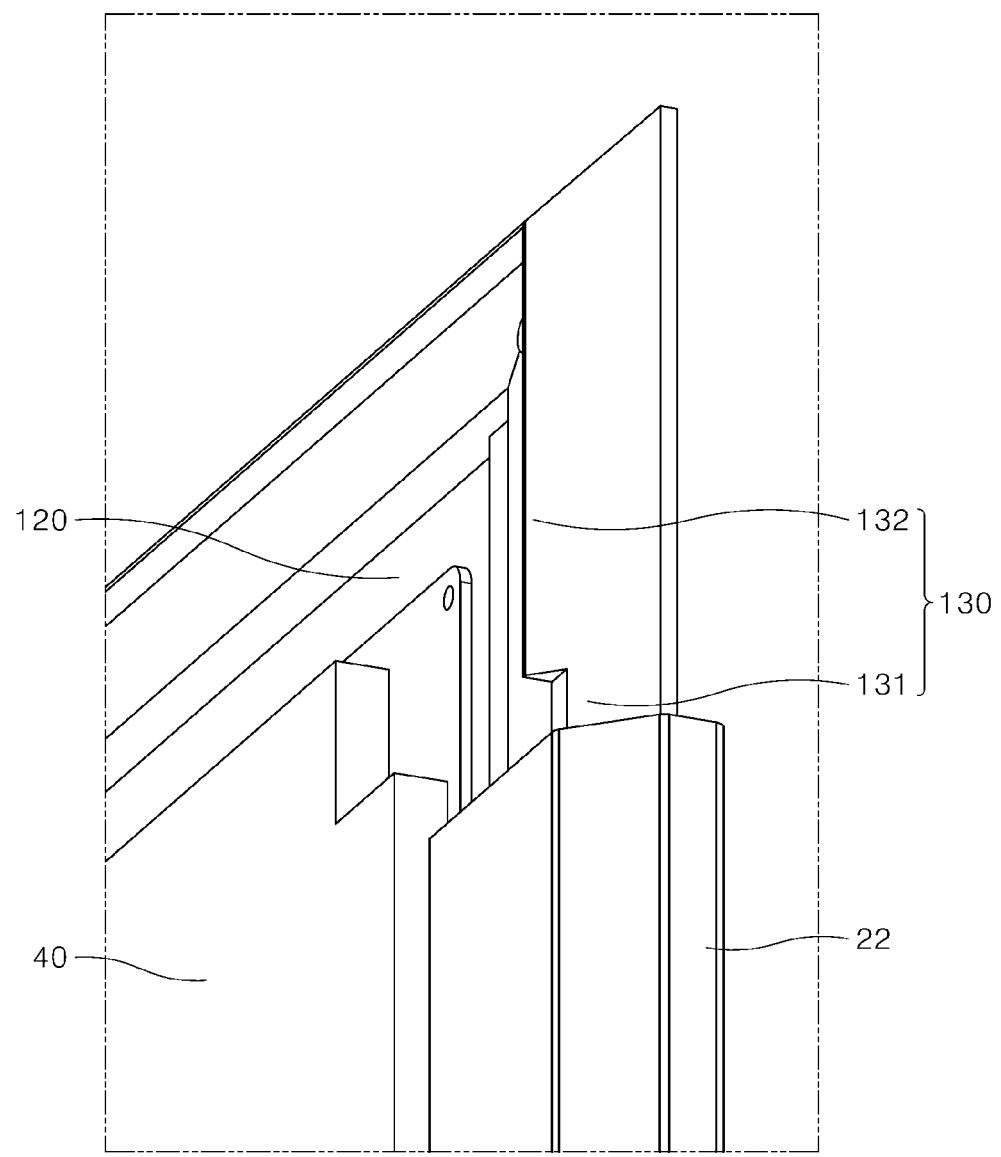
FIG. 10 is a diagram showing an arrangement of a backplate, a side cover, and a cover plate corresponding to a cover mode in the display apparatus shown in FIG. 6.

FIG. 6 is an exploded perspective view of a display apparatus according to one implementation of the present disclosure. FIG. 7 is a view showing the cover plate and the lifting module corresponding to the cover mode in the display apparatus shown in FIG. 6. FIG. 8 is a view showing the cover plate and the lifting module corresponding to the general display mode in the display apparatus shown in FIG. 6. FIG. 9 is a diagram showing an arrangement of the display panel, the side cover, and the cover plate corresponding to the cover mode in the display apparatus shown in FIG. 6. FIG. 10 is a diagram showing an arrangement of the backplate, the side cover, and the cover plate corresponding to the cover mode in the display apparatus shown in FIG. 6.

As shown in FIG. 6, the display apparatus D according to one implementation of the present disclosure includes the display module 10, the cover plate 20 and the lifting module 30.

The display module 10 includes the display panel 110 having the plate shape and including the front face in which the display area 11 is disposed, a backplate 120 facing a rear face of the display panel 110 and fixed to the display panel 110, and a side cover 130 covering a top and both sides of each of the display panel 110 and the backplate 120.

In this connection, one face that emits light among both opposing faces of the display panel 110 is referred to as the front face, and the other face that does not emit light is referred to as the rear face.

The display panel 110 can employ any structure as long as the structure has a flat plate shape and includes a display surface that displays an image.

In one example, the display panel 110 can include a pair of thin-film substrates facing each other while a light-emissive material or a polarizing material is disposed therebetween. This display panel 110 can display an image by controlling an amount of light emitted from each pixel area based on image data.

For example, the display panel 110 can include a liquid crystal display panel, a plasma display panel, a field emission display panel, an electrowetting display panel, an electroluminescence display panel or an organic light emitting display panel.

In particular, the display panel 110 does not require a separate light source when employing a light-emissive material. For example, the display panel 110 can include one of an electroluminescent display panel and an organic light emitting display panel. Thus, a weight of the display panel 110 can be reduced, such that installation of the display apparatus D can be facilitated.

The display panel 110 includes a plurality of pixel areas arranged in a matrix in the display area 11. Further, the display panel 110 can include a thin-film transistor array for individually driving each pixel area.

The thin-film transistor array includes a plurality of thin-film transistors corresponding to a plurality of pixel areas, gate lines supplying a gate signal for turning on each thin-film transistor, and data lines supplying a data signal corresponding to a luminance of each pixel area.

The display panel 110 can further include a gate driver driving the gate lines and a data driver driving the data lines.

In one example, the gate driver together with the thin-film transistor array can be disposed between a pair of substrates.

In one example, the data driver can be implemented as a driver chip 112. The driver chip 112 can be mounted on a driver circuit board 111 disposed on one edge of the rear face of the display panel 110. In one example, the driver circuit board 111 can be disposed on a lower edge of the rear face of the display panel 110. This driver circuit board 111 can be connected to the display panel 110 via at least one soft circuit board 113.

Alternatively, the gate driver can also be implemented as a driver chip and mounted on the driver circuit board 111 as in the data driver.

These gate driver and data driver can operate based on a driving signal and a power signal supplied from at least one printed circuit board 40 disposed on the rear face of the display module 10 via a signal cable.

In one example, the at least one printed circuit board 40 can implement at least one of a timing controller, a power board and a main board.

The timing controller supplies timing driving signals to the gate driver and the data driver of the display panel 110.

The power board supplies a power signal to the display panel 110.

The main board supplies a control signal to control the timing controller and the power board. Further, the main board can supply a control signal to control a motor assembly 350 of the lifting module 30.

The signal cable disposed between the rear face of the display panel 110 and the backplate 120 can be connected to the display panel 110 or the driver circuit board 111 and can be drawn out via a lead out hole passing through the backplate 120 and can be connected to the at least one printed circuit board 40. Via the signal cable, the timing driving signal, the power signal and the control signal from the at least one printed circuit board 40 can be transmitted to the display panel 110 or the driver circuit board 111.

The backplate 120 faces the rear face of the display panel 110 and is fixed to the display panel 110. In one example, the backplate 120 can be fixed to the display panel 110 via fixing means such as a double-sided tape or a screw.

The backplate 120 can be formed in a plate shape and can be made of a metal material such as aluminum. The backplate 120 can have a predefined thickness larger than that of the display panel 110. Since rigidity of the display module 10 can be improved by using the backplate 120, a flat shape of the display module 10 can be reliably maintained.

The backplate 120 can be constructed not to cover the soft circuit board 113 connected to the display panel 110.

Further, the backplate 120 includes at least one opening 121 defined therein corresponding to a portion of the driver circuit board 111 disposed on one edge of the rear face of the display panel 110.

This opening 121 can expose the driver chip 112 mounted on the driver circuit board 111.

In other words, when the backplate 120 covers the driver chip 112, a spacing between the display panel 110 and the backplate 120 increases by a thickness of the driver chip 112. Thus, it is difficult to reduce a thickness of the display apparatus D.

However, according to one implementation of the present disclosure, the backplate 120 includes the opening 121 that exposes the driver chip 112. The driver chip 112 is not covered with the backplate 120.

As a result, the spacing between the display panel 110 and the backplate 120 is not affected by a thickness of the driver chip 112, thereby slimming the display apparatus D.

The side cover 130 can be formed in a 'U' shape, and cover the top and the sides of each of the display panel 110 and the backplate 120.

A thickness of the side cover 130 is greater than a sum of a thickness of the display panel 110 and a thickness of the backplate 120. The side cover 130 is coplanar with the display panel 110 and partially protrudes rearwards beyond the backplate 120. As a result, a rear face storage area is defined by the backplate 120 and the side cover 130.

The at least one printed circuit board 40 and at least a portion of the lifting module 30 are disposed in the rear face storage area defined by the backplate 120 and the side cover 130.

A side of the side cover 130 includes a cover area 131 corresponding to the cover plate 20 and a protruding area 132 protruding beyond the cover area 131.

The cover area 131 is covered with the side portion 22 of the cover plate 20 at the highest level.

The protruding area 132 protrudes rearwards beyond the cover area 131 and thus acts as a stopper to limit vertical movement of the cover plate 20 via activation of the lifting module 30.

In other words, when the cover plate 20 is lifted up and touches the protruding area 132, the cover plate may not further ascend due to the protruding area 132. At this time, a vertical level of the cover plate 20 can be referred to as the highest level.

The cover plate 20 includes the front portion 21 corresponding to a portion of the display area 11 of the display module 10, and both side portions 22 respectively disposed on both sides of the front portion 21.

The side portion 22 extends from each of both sides of the front portion 21, covers a side face of the display module 10, and is bent to face the rear face of the display module 10.

While the cover plate 20 is located at the highest level corresponding to the cover mode, the front portion 21 covers the remaining area of the display area 11 except for the AOD area 12.

Further, the front portion 21 protrudes downwardly beyond a bottom of the display module 10 to cover some components of the lifting module 30 disposed under the display module 10. Accordingly, a length in a vertical direction of the front portion 21 corresponds to a sum of an area of the display area 11 except for the AOD area and an area in which some components of the lifting module 30 disposed under the display module 10 are disposed.

The side portion 22 can cover at least a portion of each of first and second rails 311 and 312 of the lifting module 30 respectively disposed on both opposing edges of the rear face of the display module 10, and first and second blocks 321 and 322 respectively connected to the first and second rails 311 and 312.

When the cover plate 20 is located at the lowest level corresponding to the general display mode, each of the first and second blocks 321 and 322 of the lifting module 30 fixed to the side portion 22 of the cover plate 20 should be spaced from a portion of the driver circuit board 111 exposed through the opening 121. Accordingly, the first and second blocks 321 and 322 of the lifting module 30 fixed to the side portion 22 of the cover plate 20 can be disposed above the opening 121. For example, the lowest level of each of the first and second blocks 321 and 322 is disposed above a bottom edge of the display module 10.

In the general display mode, in order to expose the entire display area 11 to the outside, the front portion 21 of the cover plate 20 must be disposed under the display area 11 of the display module 10. In addition, the side portion 22 must cover the first and second blocks 321 and 322 of the lifting module 30 located above the bottom edge of the display module 10.

To this end, the side portion 22 can include an area protruding upward beyond the front portion 21. For example, a vertical dimension of the front portion 21 can be smaller than a vertical dimension of the side portion 22.

The highest level of the cover plate 20 which has ascended via activation of the lifting module 30 corresponds to a state where a top of the side portion 22 of the cover plate 20 reaches the protruding area 132 of the side of the side cover 130.

The lifting module 30 along with the at least one printed circuit board 40 and the sound module 50 can be disposed in the rear face storage area defined by the backplate 120 and the side cover 130.

The lifting module 30 is spaced from the at least one printed circuit board 40. Further, the lifting module 30 is spaced from a portion of the driver circuit board 111 exposed through the opening 121 defined in the backplate 120. In this way, the physical impact caused by the operation of the lifting module 30 can be prevented from reaching the at least one printed circuit board 40 and the driver circuit board 111.

The lifting module 30 can include the first and second rails 311 and 312 disposed respectively on both opposing sides of the backplate 121, the first block 321 fastened to the first rail 311 and fixed to the cover plate 20, and the second block 322 fastened to the second rail 312 and fixed to the cover plate 20.

The first and second rails 311 and 312 and the first and second blocks 321 and 322 allow the cover plate 20 to move up and down while being connected to the display module 10.

Further, the lifting module 30 further includes the motor assembly 350 and means for transmitting the power of the motor assembly 350 in order to move the first and second blocks 321 and 322 in and along the first and second rails 311 and 312, respectively.

As shown in FIG. 6 and FIG. 7, according to one implementation of the present disclosure, the lifting module 30 can include a mount 330 fixed to a bottom of the backplate 120 and having a receiving hole 331 defined therein, a linear screw 340 fitted into the receiving hole 331 and extending in a vertical direction, a nut bracket 332 adjacent to the receiving hole 331 and fixed to the mount 330, a ball nut 341 fixed to the nut bracket 332 and fastened to one end of the linear screw 340, a motor bracket 333 adjacent to the nut bracket 332 and fixed to the mount 330, a motor assembly 350 fixed to the motor bracket 333, a main pulley 351 coupled to a driving shaft of the motor assembly 350, an auxiliary pulley 352 coupled to the ball nut 341, and a main belt 353 connecting the main pulley 351 and the auxiliary pulley 352 to each other.

The mount 330 is adjacent to and extends along a portion of a bottom edge of the backplate 120 and is fixed to the backplate 120. In one example, the mount 330 can be embodied as a bar-shaped rectangular parallelepiped.

For example, the mount 330 can be embodied as a bar that extends between edges of the two openings 121 respectively defined in both opposing sides of a bottom of the backplate 120.

In this connection, the mount 330 can overlap the opening 121 located in a center of a bottom of the backplate 120, and a portion of the driver circuit board 111 exposed through the opening 121.

The mount 330 can reduce the impact resulting from the transmission of the power from the motor assembly 350 to the display module 10, and can support the motor assembly 350 and the linear screw 340.

The linear screw 340 is inserted into the receiving hole 331 of the mount 330 and extends in a vertical direction.

Further, one end of the linear screw 340 is fastened to a bottom of the cover plate 20. Thus, the linear screw 340 is fixed to the cover plate 20 and transmits the power for lifting or lowering the cover plate 20 to the cover plate 20. Thus, the cover plate 20 can move in the vertical direction together with the linear screw 340.

In one example, the linear screw 340 can be fixed to a center of the bottom of the cover plate 20 or to an area adjacent to the center of the bottom thereof. In this way, it can be easier to maintain a level state of the cover plate 20 which is being lowered or lifted up.

In the cover mode, the linear screw 340 is disposed in a spaced area between the two printed circuit boards 40, and is spaced from the at least one printed circuit board 40. In this way, the physical shock caused by the movement of the linear screw 340 can be prevented from directly reaching the at least one printed circuit board 40.

The ball nut 341 is secured to the mount 330 via the nut bracket 332. The ball nut 341 is adjacent to the bottom of the cover plate 20 and is fastened to one end of the linear screw 340. Further, the ball nut 341 is fastened to the auxiliary pulley 352.

The motor assembly 350 is secured to the mount 330 via the motor bracket 333.

The main pulley 351 connected to the driving shaft of the motor assembly 350 is connected to the auxiliary pulley 352 via the main belt 353.

Accordingly, the power from the motor assembly 350 can be transmitted to the ball nut 341 via the main pulley 351, the main belt 353 and the auxiliary pulley 352 to rotate the ball nut 341.

At this time, the linear screw 340 moves in the vertical direction while rotating together with the ball nut 341. Further, the cover plate 20 fixed to the linear screw 340 moves in the vertical direction together with the linear screw 340. The first and second blocks 321 and 322 fixed to the cover plate 20 move together with the cover plate 20 in the vertical direction along the first and second rails 311 and 312.

In this way, the lifting module 30 can fix the cover plate 20 to the display module 10 and move the cover plate 20 in the vertical direction. Accordingly, the vertical level of the cover plate 20 can vary, such that a width of an area of the display area 11 of the display module 10 as covered with the cover plate 20 can vary. Thus, various screen ratios can be provided.

For example, as shown in FIG. 7, when the display apparatus D is in the cover mode, the linear screw 340 ascends via the ball nut 341 that rotates by means of the power transmitted via the motor assembly 350, the main pulley 351, the main belt 353, and the auxiliary pulley 352 until a bottom of the linear screw 340 is adjacent to the motor assembly 350. At this time, the vertical level of the cover plate 20 reaches the highest level. As a result, as shown in FIG. 1, the remaining area of the display area 11 except for the AOD area 12 is covered with the cover plate 20.

As shown in FIG. 8, when the display apparatus D is in the general display mode, the linear screw 340 descends via the ball nut 341 that rotates by means of the power transmitted via the motor assembly 350, the main pulley 351, the main belt 353, and the auxiliary pulley 352 until a top of the linear screw 340 is adjacent to the motor assembly 350. At this time, the vertical level of the cover plate 20 reaches the lowest level. As a result, as shown in FIG. 3, the entire display area 11 of the display module 10 is not covered with the cover plate 20 and is exposed to the outside.

Further, when the display apparatus D is in a mode (for example, in the cinema display mode) in which a display face having a screen ratio higher than that in the general display mode is provided, the main board of the display apparatus D can derive a target vertical level of the cover plate 20 corresponding to a target screen ratio, based on a difference between the screen ratio of the general display mode and the target screen ratio. Further, the motor assembly 350 can operate based on the target vertical level, such that the vertical level of the cover plate 20 can reach the target level.

In addition, as described above, in the cover mode, the front portion 21 of the cover plate 20 does not cover the AOD area 12 of the display area 11.

Further, in order that the vertical level of the cover plate 20 reaches the lowest level corresponding to the general display mode, the lowest level of each of the first and second blocks 321 and 322 does not correspond to a bottom edge of the display module 10, but is disposed above the opening 121. The side portion 22 of the cover plate 20 covers the first and second blocks 321 and 322 and is fixed to the first and second blocks 321 and 322, such that the side portion 22 has an area protruding upwards beyond the front portion 21.

For example, as shown in FIG. 9, as the side portion 22 has the protruding area, a vertical dimension L22 of the side portion 22 is larger than a vertical dimension L21 of the front portion 21.

In this connection, a difference between the vertical dimension L22 of the side portion 22 and the vertical dimension L21 of the front portion 21, for example, a vertical dimension L3 of the protruding area of the side portion 22 can be equal to a difference between vertical dimensions of the AOD area 12 and the protruding area 132 of the side of the side cover 130.

As shown in FIG. 10, the side cover 130 protrudes rearwards beyond the backplate 120, such that a predefined rear face storage area is defined by the backplate 120 and the side cover 130. Further, the at least one printed circuit board 40 and some components 311, 312, 321, 322, 330, and 340 of the lifting module 30 can be received in the rear face receiving area defined by the backplate 120 and the side cover 130.

Further, when the vertical level of the cover plate 20 is the highest level corresponding to the cover mode, a top of the side portion 22 of the cover plate 20 can be adjacent to the protruding area 132 of the side of the side cover 130.

The side portion 22 of the cover plate 20 can extend to overlap a portion of each of both opposing edges of the backplate 130 disposed on the rear face of the display module 10.

As described above, the display apparatus D according to one implementation of the present disclosure includes the cover plate 20 covering the portion of the display module 10 and the lifting module 30 that lifts or lowers the cover plate 20. The cover plate 20 can be lifted up or lowered by the lifting module 30 such that the cover plate is disposed under the display area 11, or is disposed at a vertical level such that the cover plate overlaps the portion of the display area 11. The outer appearance of the cover plate 20 can be easily selected from a variety of designs according to the indoor interior and the user's taste. As a result, deterioration in the aesthetics of the indoor interior due to the display apparatus D can be reduced.

In any mode of the plurality of view modes, the AOD area 12 of the display area 11 as the top area is not covered with the cover plate 20. The AOD data can be displayed in the AOD area 12. Thus, the display apparatus D can have the AOD function.

Further, varying the vertical level of the cover plate 20 via activation of the lifting module 30 can allow a width of a lower partial area of the display area 11 as covered with the cover plate 20 to vary. As a result, while the cinema area 13 corresponding to the screen ratio higher than the screen ratio corresponding to the entire display area 11 is provided, the lower other partial area of the display area 11 that is not used for image display is covered with the cover plate 20. As a result, the aesthetics, convenience, and utility of the display apparatus D can be improved.

Further, the lifting module 30 of the display apparatus D according to one implementation of the present disclosure shown in FIG. 1, FIG. 2, FIG. 3, FIG. 4, FIG. 6, FIG. 7, FIG. 8 and FIG. 9 includes the linear screw 340 fixed to the cover plate 20, and lifts up or lower the cover plate 20 via the linear screw 340 moving in the vertical direction. In this connection, the linear screw 340 which moves in the vertical direction needs to be spaced from the at least one printed circuit board 40, etc. to prevent the damage thereto caused by the physical shock during the movement of the screw 340.

However, the linear screw 340 extends in the vertical direction and is disposed in the spaced area between two printed circuit boards 40. A length of the linear screw 340 corresponds to a moving range of the cover plate 20. Accordingly, a percentage of an area allocated to the movement of the linear screw 340 relative to the rear face receiving area defined by the backplate 120 and the side cover 130 is relatively larger. Accordingly, there is a possibility that components such as the at least one printed circuit board 40 adjacent to the linear screw 340 may be affected or damaged.

To prevent or address this issue, another implementation of the present disclosure is provided.

Figure 11:
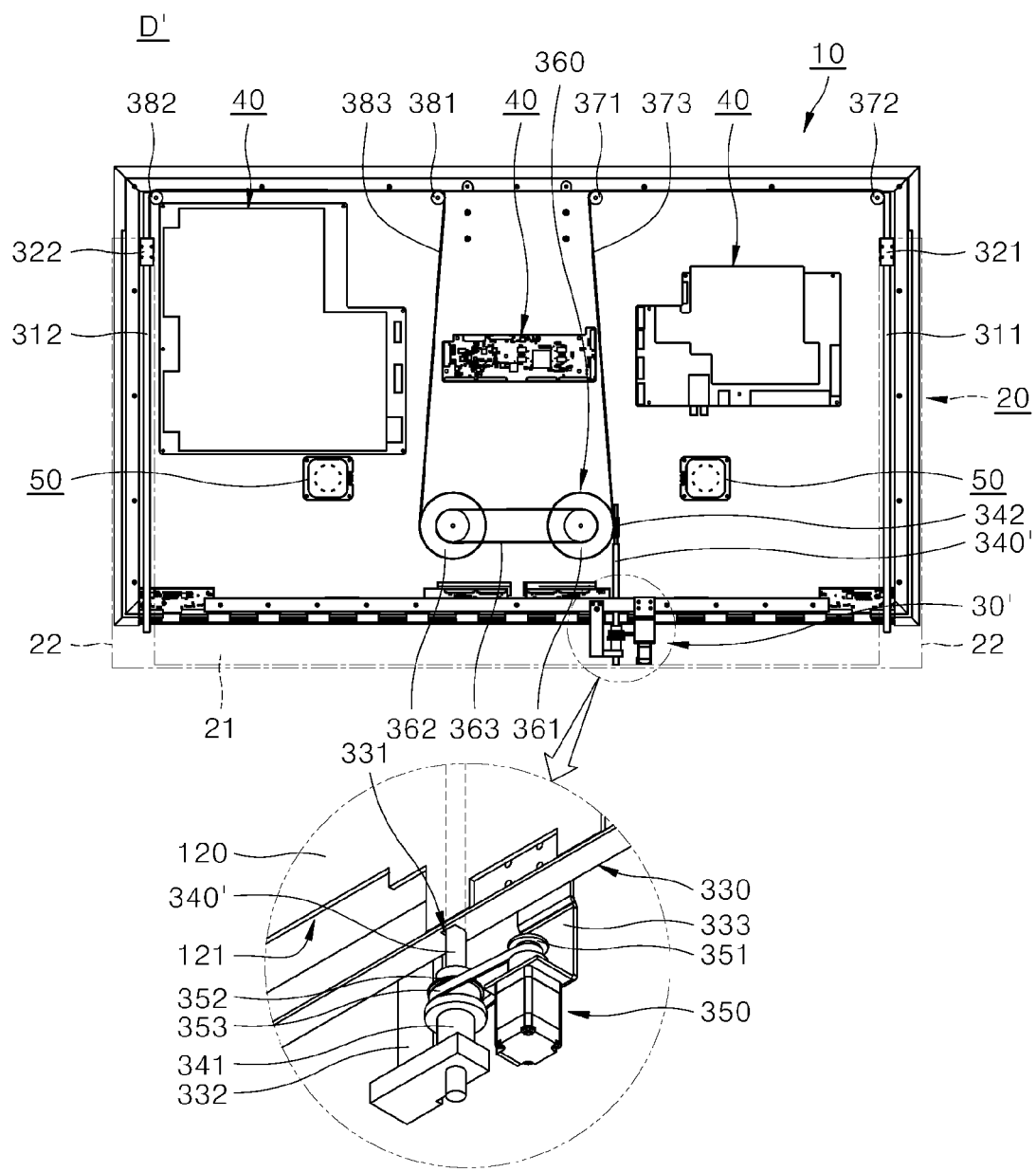
FIG. 11 is a diagram showing a cover plate and a lifting module corresponding to a cover mode in a display apparatus according to another implementation of the present disclosure.
Figure 12:
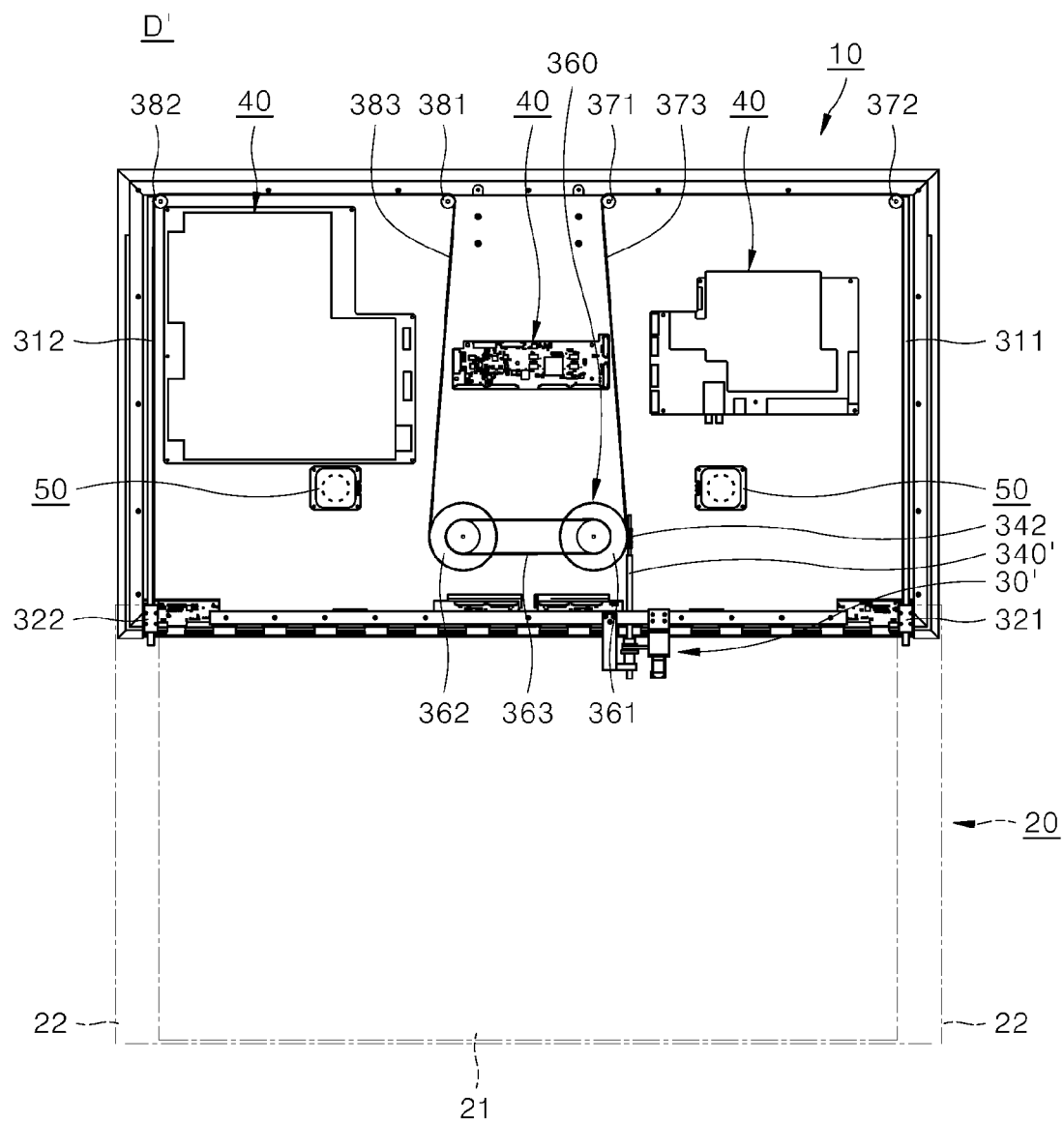
FIG. 12 is a diagram showing a cover plate and a lifting module corresponding to a general display mode in the display apparatus shown in FIG. 11.
Figure 13:
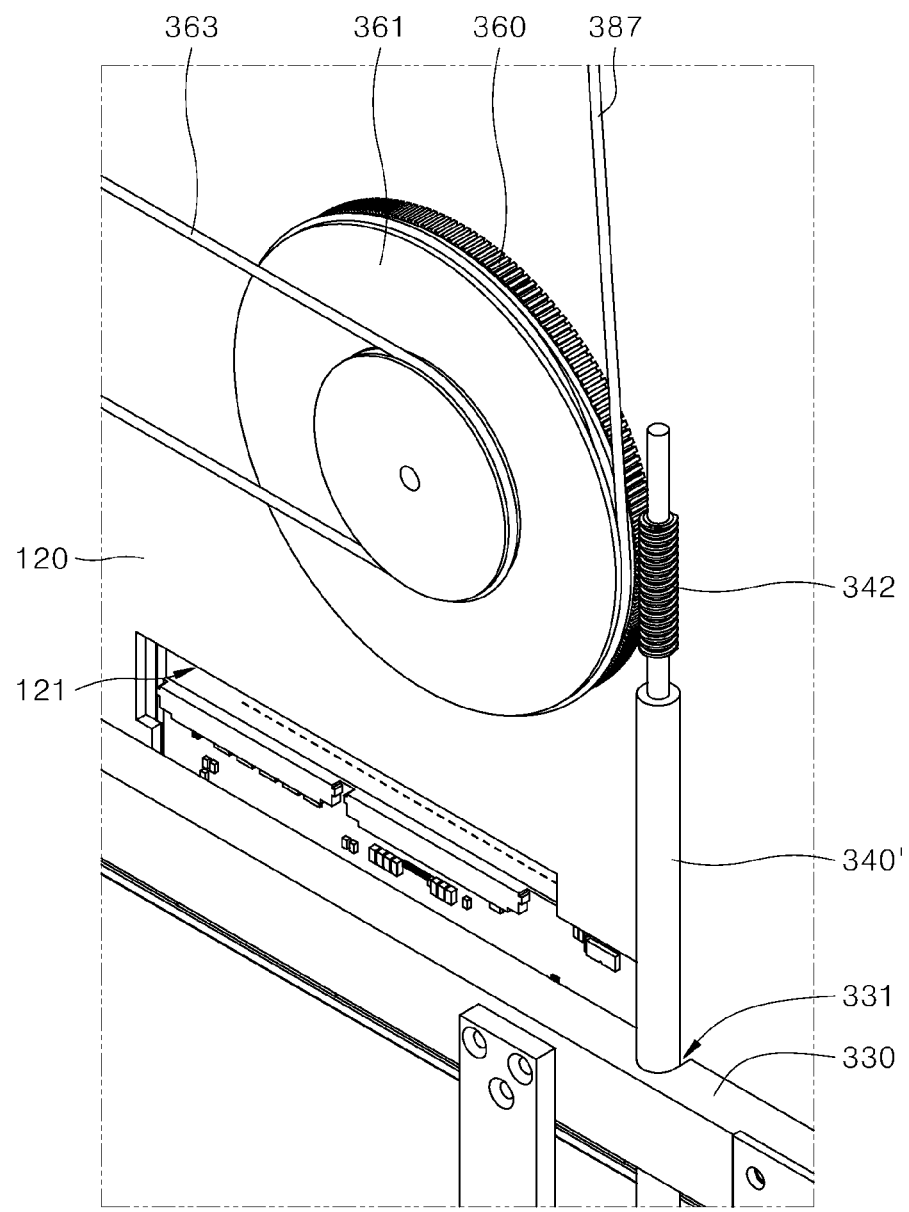
FIG. 13 is a diagram showing a worm wheel and a worm gear of FIGS. 11 and 12.

FIG. 11 is a diagram showing a cover plate and a lifting module corresponding to the cover mode in a display apparatus according to another implementation of the present disclosure. FIG. 12 is a diagram showing the cover plate and the lifting module corresponding to the general display mode in the display apparatus shown in FIG. 11. FIG. 13 is a diagram showing a worm wheel and a worm gear of FIGS. 11 and 12.

As shown in FIG. 11, a display apparatus D' according to another implementation of the present disclosure has the same configuration as that in one implementation of the present disclosure shown in FIGS. 1 to 10, except that a linear screw 340' of a lifting module 30' is not fixed to the cover plate 20, and the lifting module 30' further includes a worm gear 342, a worm wheel 360, a plurality of wire pulleys 361, 362, 371, 372, 381, and 382 and a plurality of wires 373 and 383. Hereinafter, duplicate descriptions therebetween are omitted.

As shown in FIG. 11, the lifting module 30' of the display apparatus D' according to another one implementation of the present disclosure includes the first and second rails 311 and 312 respectively arranged on both opposing sides of the backplate 121, the first block 321 fastened to the first rail 311 and fixed to the cover plate 20, and the second block 322 fastened to the second rail 312 and fixed to the cover plate 20.

Further, the lifting module 30' includes the mount 330 fixed to the bottom of the backplate 120 and including the receiving hole 331, the linear screw 340' inserted into the receiving hole 331 and extending in a vertical direction, the nut bracket 332 adjacent to the receiving hole 331 and fixed to the mount 330, the ball nut 341 fixed to the nut bracket 332 and fastened to one end of the linear screw 340', the motor bracket 333 adjacent to the nut bracket 332 and fixed to the mount 330, the motor assembly 350 fixed to the motor bracket 333, the main pulley 351 coupled to the driving shaft of the motor assembly 350, the auxiliary pulley 352 coupled to the ball nut 341, and the main belt 353 connecting the main pulley 351 and the auxiliary pulley 352 to each other. In this connection, the linear screw 340' is not fastened to the cover plate 20, but is fastened to the receiving hole 331 and the ball nut 341.

Further, the lifting module 30' can further include the worm gear 342 disposed at the other end of the linear screw 340', the worm wheel 360 disposed on the backplate 120 and fastened to the worm gear 342, a first main wire pulley 361 connected to the worm wheel 360, a second main wire pulley 362 disposed on the backplate 120 and adjacent to the first main wire pulley 361, an auxiliary belt 363 connecting the first and second main wire pulleys to each other, a first top wire pulley 371 disposed at a top of the backplate 120 and opposite to the first main wire pulley 361 in the vertical direction, a first side wire pulley 372 disposed at one side of the top of the backplate 120 and facing away the first top wire pulley 371 in a horizontal direction, a first wire 373 connected to the first block 321, a second top wire pulley 381 disposed at the top of the backplate 120 and opposite to second main wire pulley 362 in the vertical direction, a second side wire pulley 382 disposed at the other side of the top of the backplate 120 and facing away the second top wire pulley 381 in a horizontal direction, and a second wire 383 connected to the second block 322.

In this connection, the first wire 373 is connected to the first block 321, the first side wire pulley 372, the first top wire pulley 371, and the first main wire pulley 361.

Further, the second wire 383 is connected to the second block 322, the second side wire pulley 382, the second top wire pulley 381, and the second main wire pulley 362.

The power from the motor assembly 350 is transmitted to the ball nut 341 via the main pulley 351, the main belt 353 and the auxiliary pulley 352, thereby rotating the ball nut 341.

As shown in FIG. 13, the linear screw 340' rotates together with the ball nut 341 (FIG. 11), such that the worm gear 342 connected to the other end of the linear screw 340' also rotates together therewith.

Due to the rotation of the worm gear 342, the worm wheel 360 rotates. Thus, the first main wire pulley 361 connected to the worm wheel 360, and the second main wire pulley 362 connected to the first main wire pulley 361 via the auxiliary belt 363 also rotate together with the worm wheel 360.

Further, as shown in FIG. 11, the first wire 373 connected to the first main wire pulley 361 is wound around or released from the first main wire pulley 361. The second wire 383 connected to the second main wire pulley 362 is wound around or released from the second main wire pulley 362.

For example, when the first and second wires 373 and 383 are respectively wound around the first and second main wire pulleys 361 and 362, the first and second blocks 321 and 322 respectively ascend via the first and second wires 373 and 383 that are pulled tightly, such that the cover plate 20 ascends together with the first and second blocks 321 and 322.

To the contrary, as shown in FIG. 12, when the first and second wires 373 and 383 are respectively released from the first and second main wire pulleys 361, 362, the first and second blocks 321 and 322 respectively descend via the first and second wires 373 and 383 which are released loosely, such that the cover plate 20 descends together with the first and second blocks 321 and 322.

In this way, the cover plate 20 can move vertically via the activation of the lifting module 30'.

As described above, according to another implementation of the present disclosure, the cover plate 20 is lifted up or lowered via a length adjustment of each of the first and second wires 373 and 383.

This eliminates the need for the linear screw 340' to have a length corresponding to a range in which the vertical level of the cover plate 20 varies. Therefore, the physical impact caused by the movement of the linear screw 340' can be prevented from being applied to the at least one printed circuit board 40 or the like.

Although the embodiments of the present disclosure have been described in more detail with reference to the accompanying drawings, the present disclosure is not necessarily limited to these embodiments. The present disclosure can be implemented in various modified manners within the scope not departing from the technical idea of the present disclosure. Accordingly, the embodiments disclosed in the present disclosure are not intended to limit the technical idea of the present disclosure, but to describe the present disclosure. The scope of the technical idea of the present disclosure is not limited by the embodiments. Therefore, it should be understood that the embodiments as described above are illustrative and non-limiting in all respects. The scope of protection of the present disclosure should be interpreted by the claims, and all technical ideas within the scope of the present disclosure should be interpreted as being included in the scope of the present disclosure.

What is claimed is:

1. A display apparatus comprising:
    a display module including a display panel for displaying an image in a display area;
    a cover plate covering a portion of the display area; and
    a lifting module disposed on a rear face of the display module to lift up or lower down the cover plate,
    wherein the display area includes an Always On display (AOD) area,
    wherein when the cover plate ascends via activation of the lifting module, the display area includes a first area that is flat and which is covered with the cover plate and a second area that is flat and which is exposed to outside, and
    wherein the AOD area is included in the second area.

2. The display apparatus of claim 1, wherein the display module displays AOD data in the AOD area, based on an AOD request signal received via a user input interface.

3. The display apparatus of claim 1, wherein the display module operates in one of a plurality of view modes,
    wherein the plurality of view modes include a first mode in which an image is displayed in an entirety of the display area, and a second mode in which an image is displayed in the AOD area of the display area, and
    wherein in the second mode, the first area is a remaining area of the display area except for the AOD area.

4. The display apparatus of claim 3, wherein the cover plate ascends via activation of the lifting module until the cover plate covers the remaining area of the display area except for the AOD area, based on a second mode request signal received via the user input interface.

5. The display apparatus of claim 3, wherein in the first mode, the entirety of the display area of the display module is exposed to the outside, and
    wherein the cover plate descends via activation of the lifting module until the entirety of the display area is exposed to the outside, based on a first mode request signal received via the user input interface.

6. The display apparatus of claim 3, wherein the plurality of view modes further include a third mode in which an image is displayed in a cinema area of the display area, and the third mode corresponds to a screen ratio different from a screen ratio corresponding to the first mode, and
    wherein the cover plate is lifted up or lowered down via activation of the lifting module until the cover plate covers a remaining area of the display area except for the cinema area, based on a third mode request signal received via the user input interface.

7. The display apparatus of claim 1, wherein the cover plate includes:
    a front portion facing to the display area; and
    two side portions respectively disposed on both opposing sides of the front portion,
    wherein each of the side portions is bent to surround a portion of a side of the display module, and extends toward the rear face of the display module, and
    wherein a vertical dimension of each side portion is larger than a vertical dimension of the front portion.

8. The display apparatus of claim 7, wherein the display module further includes:
    a backplate facing a rear face of the display panel and fixed to the display panel; and
    a side cover surrounding a top and sides of each of the display panel and the backplate, wherein a side of the side cover includes a cover area corresponding to the cover plate and a protruding area protruding beyond the cover area, and wherein the protruding area acts as a stopper to limit a vertical movement of the cover plate via activation of the lifting module.

9. The display apparatus of claim 8, wherein the display module further includes a driver circuit board disposed on one edge of the rear face of the display panel, wherein a driver chip configured to drive a signal line of the display panel is mounted on the driver circuit board, and wherein the backplate has at least one opening defined therein to expose the driver circuit board.

10. The display apparatus of claim 9, wherein the display module further includes at least one printed circuit board connected to the display panel or the driver circuit board to supply a signal for driving the display panel, and wherein the at least one printed circuit board and at least a portion of the lifting module are disposed in a rear face storage area defined by the backplate and the side cover.

11. A display apparatus comprising:
a display module including a display panel having a display area for displaying an image;
a cover plate covering a portion of the display module; and
a lifting module disposed on a rear face of the display module opposite to the display area of the display panel, wherein the lifting module is configured to lift up or lower down the cover plate,
wherein the display module operates in one of a plurality of view modes respectively corresponding to different vertical levels of the cover plate,
wherein the plurality of view modes include:
a first mode in which an image is displayed in an entirety of the display area;
a second mode in which an image is displayed an image in an Always On Display (AOD) area of the display area; and
a third mode in which an image is displayed in a cinema area of the display area, the third mode corresponding to a screen ratio different from a screen ratio corresponding to the first mode,
wherein in the second mode, a remaining area of the display area except for the AOD area is covered with the cover plate, and
wherein the cover plate ascends to a highest level corresponding to the second mode via activation of the lifting module, based on a second mode request signal received via a user input interface.

12. The display apparatus of claim 11, wherein in the second mode, the display module displays AOD data in the AOD area, based on an AOD request signal received via the user input interface.

13. The display apparatus of claim 11, wherein in the first mode, the entirety of the display area is exposed to outside, and wherein the cover plate descends to a lowest level corresponding to the first mode via activation of the lifting module, based on a first mode request signal received via the user input interface.

14. The display apparatus of claim 11, wherein in the third mode, the cinema area of the display area is exposed to outside and a remaining area of the display area except for the cinema area is covered with the cover plate, and wherein the cover plate is lifted up or lowered down via activation of the lifting module until the cover plate is located at a predefined level corresponding to the third mode, based on a third mode request signal received via the user input interface.

15. The display apparatus of claim 11, wherein the cover plate includes:
a front portion facing to the display area; and
two side portions respectively disposed on both opposing sides of the front portion, wherein each of the side portions is bent to surround a portion of a side of the display module, and extends toward the rear face of the display module,
wherein a vertical dimension of each side portion is larger than a vertical dimension of the front portion.

16. The display apparatus of claim 11, wherein the display module further includes:
a backplate facing a rear face of the display panel and fixed to the display panel; and
a side cover surrounding a top and sides of each of the display panel and the backplate,
wherein a side of the side cover includes a cover area corresponding to the cover plate and a protruding area protruding beyond the cover area, and
wherein the protruding area acts as a stopper to limit a vertical movement of the cover plate via activation of the lifting module.

17. The display apparatus of claim 16, wherein the display module further includes a driver circuit board disposed on one edge of the rear face of the display panel, wherein a driver chip configured to drive a signal line of the display panel is mounted on the driver circuit board, and wherein the backplate has at least one opening defined therein to expose the driver circuit board.

18. The display apparatus of claim 16, wherein the lifting module includes:
a first rail and a second rail respectively disposed on both opposing sides of the backplate;
a first block fastened to the first rail and fixed to the cover plate; and
a second block fastened to the second rail and fixed to the cover plate.

19. The display apparatus of claim 18, wherein the lifting module further includes:
a mount fixed to a bottom of the backplate and having a receiving hole defined therein;
a linear screw inserted into the receiving hole and extending in a vertical direction;
a nut bracket adjacent to the receiving hole and fixed to the mount;
a ball nut fixed to the nut bracket and fastened to one end of the linear screw;
a motor bracket adjacent to the nut bracket and fixed to the mount;
a motor assembly fixed to the motor bracket;
a main pulley coupled to a driving shaft of the motor assembly;
an auxiliary pulley fastened to the ball nut; and
a main belt connecting the main pulley and the auxiliary pulley to each other,
wherein one end of the linear screw is fixed to a bottom of the cover plate, and
wherein the cover plate moves vertically together with the linear screw.

20. The display apparatus of claim 19, wherein the lifting module further includes:

a worm gear disposed at the other end of the linear screw;
a worm wheel disposed on the backplate and fastened to the worm gear;
a first main wire pulley fastened to the worm wheel;
a second main wire pulley disposed on the backplate and adjacent to the first main wire pulley;
an auxiliary belt connecting the first and second main wire pulleys to each other;
a first top wire pulley disposed at a top of the backplate and opposite to the first main wire pulley in the vertical direction;
a first side wire pulley disposed at one side of the top of the backplate and facing away the first top wire pulley in a horizontal direction;
a first wire connected to the first block, the first side wire pulley, the first top wire pulley, and the first main wire pulley;
a second top wire pulley disposed at the top of the backplate and opposite to the second main wire pulley in the vertical direction;
a second side wire pulley disposed at the other side of the top of the backplate and facing away the second top wire pulley in the horizontal direction; and
a second wire connected to the second block, the second side wire pulley, the second top wire pulley, and the second main wire pulley.

* * * * *